Feb. 10, 1931.  C. A. BOWLUS  1,792,066
WELDING MACHINE
Filed July 26, 1929
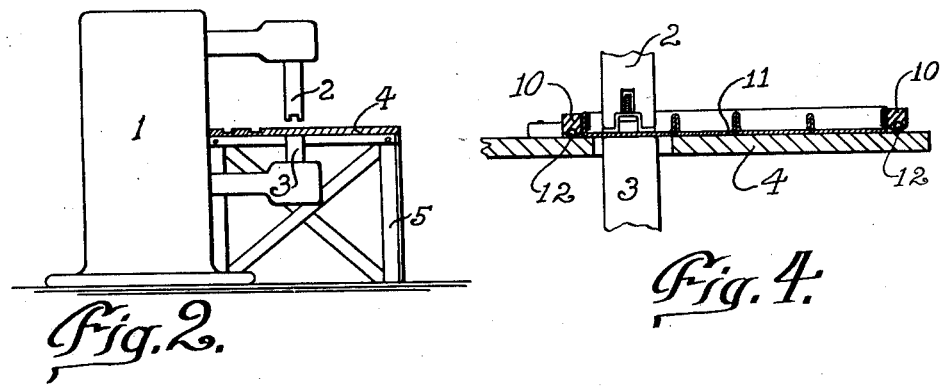
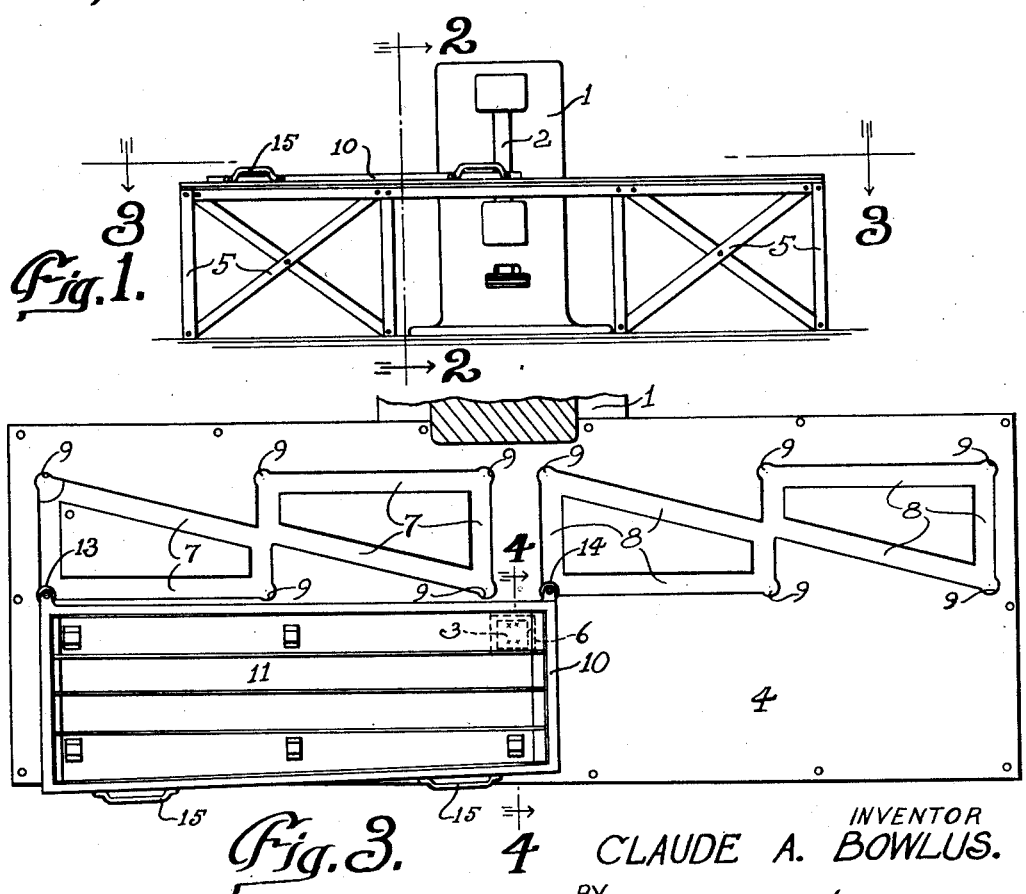
INVENTOR
CLAUDE A. BOWLUS.
BY
ATTORNEY.

Patented Feb. 10, 1931

1,792,066

UNITED STATES PATENT OFFICE

CLAUDE A. BOWLUS, OF BIRMINGHAM, MICHIGAN, ASSIGNOR TO CHRYSLER CORPORATION, OF DETROIT, MICHIGAN, A CORPORATION OF DELAWARE

WELDING MACHINE

Application filed July 26, 1929. Serial No. 381,185.

This invention relates to welding machines.

The main objects of this invention are to provide an improved construction of welding machine in which successive pieces of work may have welds made thereon at exactly the same relative positions and to provide an improved welding machine which is particularly useful for welding attaching bolt clips onto automobile running boards.

An illustrative embodiment of this invention is shown in the accompanying drawings, in which:

Fig. 1 is a view in front side elevation of my improved machine.

Fig. 2 is a sectional view on the line 2—2 of Fig. 1.

Fig. 3 is an enlarged view taken on the line 3—3 of Fig. 1.

Fig. 4 is an enlarged sectional view taken on the line 4—4 of Fig. 3.

In the fabrication of various articles of manufacture which have to be assembled with other articles on a production basis, it is necessary that bolt clips, lugs and such which are welded on the articles be placed in exact predetermined positions in order to facilitate assembly. This is particularly true of metal running boards for automobiles which have a series of bolt supporting clips electrically welded on the under side thereof.

With my improved welding machine the articles of work, such as running boards, are placed in a frame which is supported on a work table. The table is provided with two independent trackways which guide the frame in a predetermined path. These trackways are formed by a series of straight portions intersecting each other at abrupt angles. At the various points of intersection, sockets are provided for receiving guide rollers on the work frame so as to accurately position the work with respect to the welding electrode.

In the construction shown in the drawings, a welding machine 1 is provided with the usual welding electrodes 2 and 3 arranged in vertically spaced relation. The upper electrode 2 is vertically movable toward the lower electrode 3 so as to engage work therebetween for the welding operation.

A work table 4 is supported by a frame work 5 with the top surface thereof on substantially the same horizontal plane as the upper end of the electrode 3. An aperture 6 is provided in the table 4 for receiving the upstanding end of the electrode 3, said aperture being of larger size than the electrode, so as to have clearance therewith.

The top surface of the table 4 is provided with a pair of independent trackways 7 and 8, of substantially identical design, milled or otherwise suitably formed therein. The trackways are formed by a series of straight portions which intersect at their ends by abrupt angles. At each of these end intersections or junctions, the trackways are provided with sockets 9 which are accurately positioned in predetermined positions.

The work table 4 is provided with a frame or jig 10 resting thereon and shiftable thereover for receiving pieces of work, such as metal running boards 11. The under side of the frame 10 is provided with anti-friction devices 12 which facilitate manual shifting of the frame around over the surface of the table.

Means are provided for guiding the frame in a predetermined path of travel and comprise rollers 13 and 14 mounted on the frame 10 at two corners thereof, which fit loosely in the trackways 7 and 8, respectively, and which fit snugly in the sockets 9 so as to accurately position the frame 10 and work carried thereby with respect to the electrodes 2 and 3. Handles 15 are provided on the frame 10 for a workman to grasp.

In the use of this machine, the articles of work 11 are placed in the frame 10 and the frame shifted to the end of any straight portion of the trackways, and the rollers 13 and 14 manually held snugly in the sockets 9.

The welding operation is then performed at this point and the frame shifted to the end of another straight portion and again positioned in the sockets at that point. Any sequence of positions may be followed.

Although but one specific embodiment of this invention has been herein shown and described, it will be understood that numerous details of construction shown may be altered or omitted without departing from the spirit of my invention as defined by the following claims.

What I claim is:

1. An electric welding machine having a table, an anode and a cathode adjacent the plane of said table for welding work thereon, a pair of independent trackways on said table, a shiftable work holding frame, and means on said frame engaging each of said trackways for guiding said frame to predetermined positions relatively to said table.

2. An electric welding machine having a table, an anode and a cathode adjacent the plane of said table for welding work thereon, a pair of independent trackways having similar patterns on said table, a work holding frame, and means on said frame engaging each of said trackways for guiding said frame to predetermined positions relatively to said table.

3. An electric welding machine having a table, an anode and a cathode adjacent the plane of said table for welding work thereon, a pair of independent trackways on said table, sockets spaced at intervals along said trackways and in the same relative positions, a work holding frame adapted to be shifted around over said table, and means on said frame engaging each of said trackways and adapted to fit in said sockets for guiding and holding said frame to predetermined positions relatively to said table.

4. An electric welding machine having a table, an anode and a cathode adjacent the plane of said table for welding work thereon, a pair of independent trackways having similar patterns on said table, sockets spaced at intervals along said trackways and in the same relative positions, a work holding frame adapted to be shifted around over said table, and means on said frame engaging each of said trackways and adapted to fit in said sockets for guiding and holding said frame to predetermined positions relatively to said table.

5. An electric welding machine having a table, an anode and a cathode adjacent the plane of said table for welding work thereon, a pair of independent trackways recessed in the top surface of said table, a work holding frame adapted to be shifted around over said table, and a pair of rollers on said frame, one of said rollers fitting in one of said trackways and the other of said rollers fitting in the other of said trackways for guiding said frame to predetermined positions relative to said table.

6. An electric welding machine having a table, an anode and a cathode adjacent the plane of said table for welding work thereon, a pair of independent trackways recessed in the top surface of said table, said trackways being of similar pattern, a work holding frame adapted to be shifted around over said table, and a pair of rollers on said frame, one of said rollers fitting in one of said trackways and the other of said rollers fitting in the other of said trackways for guiding said frame to predetermined positions relative to said table.

7. An electric welding machine having a table, an anode and a cathode adjacent the plane of said table for welding work thereon, a pair of independent trackways recessed in the top surface of said table, a work holding frame adapted to be shifted around over said table, a pair of rollers on said frame, one of said rollers fitting in one of said trackways and the other of said rollers fitting in the other of said trackways for guiding said frame to predetermined positions relative to said table, and sockets at spaced intervals along said trackways for receiving said rollers to accurately position said frame.

8. An electric welding machine having a table, an anode and a cathode adjacent the plane of said table for welding work thereon, a pair of independent trackways recessed in the top surface of said table, a work holding frame adapted to be shifted around over said table, a pair of rollers on said frame, one of said rollers fitting in one of said trackways and the other of said rollers fitting in the other of said trackways for guiding said frame to predetermined positions relative to said table, and sockets at spaced intervals along said trackways and located at the same relative positions therein for receiving said rollers to accurately position said frame.

9. An electric welding machine having a table, an anode and a cathode adjacent the plane of said table for welding work thereon, a pair of independent trackways recessed in the top surface of said table, said trackways being of substantially identical pattern, sockets at spaced intervals along said trackways, said sockets being located at the same relative positions in said trackways, a work holding frame adapted to rest on said table and be shifted thereover, a pair of rollers on said frame, one of said rollers fitting in one of said trackways and the other of said rollers fitting in the other of said trackways for guiding said frame to predetermined positions relatively to said table, said rollers fitting in said sockets for accurately positioning said frame, said trackways being formed of a series of substantially straight portions and said sockets being located at the junctions of said straight portions.

10. Apparatus for performing a plurality of like operations at predetermined locations on a piece of work including a table, an operating member, a pair of independent trackways on said table, a shiftable work holding frame, and members on said frame engaging each of said trackways for guiding said frame to predetermined positions relative to said table.

11. Apparatus for successively performing an operation on a piece of work at predetermined longitudinally and laterally spaced locations including a table; an operating member; a shiftable work holding carriage; a trackway on said table having laterally spaced longitudinal branch, transverse branches connecting the longitudinal branches, and diagonal branches connecting the transverse branches; and means on said carriage engaging said trackway for guiding said carriage to predetermined positions relative to said table.

12. Apparatus for successively performing an operation on a piece of work at predetermined longitudinally and laterally spaced locations including a table; an operating member; a shiftable work holding carriage; a trackway on said table having laterally spaced longitudinal branch, transverse branches connecting the longitudinal branches, and diagonal branches connecting the transverse branches; means on said carriage engaging said trackway for guiding said carriage to predetermined positions relative to said table; and sockets at the intersections of said branches for receiving said means.

13. Apparatus for successively performing an operation on a piece of work at predetermined longitudinally and laterally spaced locations including a table, an operating member, a carriage for holding a piece of work, said carriage being shiftable around said table, trackways for guiding the movement of said carriage in predetermined loci, and means in said trackway for interrupting free movement of said carriage in said loci so as to hold a piece of work in predetermined locations with respect to said operating member.

CLAUDE A. BOWLUS.